Patented Mar. 17, 1925.

1,530,393

UNITED STATES PATENT OFFICE.

JACQUE C. MORRELL, OF OAK PARK, ILLINOIS.

PROCESS OF MAKING ADSORBENT CARBON.

No Drawing. Application filed December 21, 1923. Serial No. 682,112.

*To all whom it may concern:*

Be it known that I, JACQUE C. MORRELL, a citizen of the United States, residing at Oak Park, in the county of Cook and State of Illinois, have invented certain new and useful Improvements in Processes of Making Adsorbent Carbon, of which the following is a specification.

This application is a continuation-in-part of my U. S. Patents Nos. 1,478,985, 1,478,986 and 1,478,987 on built-up, structural adsorbent charcoal and process of making same. In these patents I have disclosed methods for preparing a built-up, structural adsorbent charcoal by incorporating carbon with a binding material which chars on heating and then molding the mixture, comminuting the molded material and charring the binding material therein and then activating. The present invention appropriates the various processes disclosed in these patents, and in the preparation of the charcoal I furthermore employ materials, in addition to those set forth in these patents, to increase the porosity and hence the efficiency of the charcoal.

This invention relates to artificial or synthetic charcoals.

These charcoals may be employed for the removal of impurities from air for respiration, or for the concentration and recovery for further use of valuable gases or vapors in a great many industrial processes. This charcoal may also be used in various industrial and laboratory processes as a decolorizing and purifying agent for the removal of color and impurities from liquids and solutions, for example, in the refining of oils of a vegetable, mineral or animal character, and decolorizing and refining of sugar, glycerine and other organic substances. Also, as an adsorbent for gases and vapors and decolorizer of various substances and as a deodorant and purifier of all types of liquids and solutions, its use is practically unlimited. It may be applied wherever adsorptive, decolorizing or purifying material can be used in the liquid or gas phase.

Some of its important industrial uses are:

The recovery of gasoline vapor from natural gases and still gases. The recovery and purification of vaporized solvents in air or gas fixtures.

The refining and decolorization of petroleum and coal tar distillates and their derivatives.

The refining and decolorizing of animal and vegetable oils.

For air conditioning and humidity control.

As a catalyst.

For decolorizing and purifying of sugar solutions, glycerine and aqueous or non-aqueous solutions of organic compounds.

Purification of water and air.

As a deodorant.

Among the objects of the present invention is the preparation of built-up, structural, adsorbent charcoal by a new method which comprises the incorporation or introduction in the material employed for the preparation of the charcoal of various inorganic materials which are later removed in order to increase the porosity and hence the efficiency of the charcoal. These inorganic materials may be of such nature as to permit their removal by one of two methods; namely, volatilization or solution, as will later appear from the specific examples herein.

In preparing the adsorbent charcoal by my new process, I appropriate the processes disclosed in my U. S. patents heretofore named, making such modifications as are necessary or convenient for the purposes of the present process. The component to be removed is added to the adsorbent charcoal as it is produced by the processes disclosed in my co-pending applications.

I prefer to employ the process disclosed in my application Ser. No. 284,459, wherein some form of carbon or charcoal is added to an emulsion of a binder which chars on heating and after filtering the mixture, drying and molding the residue, comminuting the molded material and then activating by heating, which activation may be assisted, if desired, by treatment with steam or other mild oxidizing agent. In carrying out this process, the materials which are later removed by volatilization or solution must be insoluble in water or other liquid medium of the emulsion employed. The incorporation of the component to be removed is made, preferably, at the stage of the process where the carbon is added to the emulsified binder. Some of the methods of accomplishing this are as follows:

(a) The component to be removed is intimately mixed with the carbon and this mixture added to the emulsified binder.

(b) The carbon in aqueous suspension is added to an aqueous suspension of the component to be removed or vice versa and the mixed suspension, in turn, added to the emulsified binder.

(c) The suspension of carbon and component to be removed may be added separately to the emulsified binder in any order, but preferably the suspension of the component to be removed is added first.

The mixture prepared by either of these methods is then filtered and the residue subjected to drying, molding, comminuting, charring and activation. The quantity of carbon may vary from 1–4 times the total actual binding material.

Other methods of accomplishing this purpose, as set forth in my co-pending applications, are as follows:

(a) Introducing a mixture of the carbon and component to be removed into a solution of a binding material which chars on heating, separating the solvent by distillation and then molding the residue, comminuting the molded material, charring the binding material therein and activating.

(b) Mixing carbon and the component to be removed with a liquid binder or a solution of a binder which chars on heating and then separating the solvent by distillation, molding the residue, comminuting the molded material, charring the binding material therein and activating.

(c) Mixing carbon and the component to be removed with pitch or other non-fluid binder which chars on heating, moistening the latter with oil, tar or other organic liquid which will dissolve, disperse or flux with the binder, molding the mixture and then comminuting the molded material, charring the binding material therein and activating. In this process the excess liquid should be removed by gently heating either before or after molding.

(d) Mixing carbon and the component to be removed with a non-fluid, water-soluble binding material which chars on heating, moistening with water, molding and then comminuting the molded material, charring the binding material therein and activating. The excess water is removed by evaporation directly before or after molding. Under certain circumstances a concentrated solution of a solid water-soluble binder may be used instead of a non-fluid, water-soluble binder.

(e) Mixing carbon with a non-fluid binding material which chars on heating, heating the mixture to such a temperature as will cause the binder to melt or soften and molding the mixture or else heating during the molding step, and then comminuting the molded material, charring the binding material therein and activating.

The term "carbon" as herein used is intended to cover pure carbon as well as a mixture of natural or artificial origin containing a high percentage of carbon. This includes the various charcoals and carbons of animal, vegetable or mineral origin, more specifically described and named in my co-pending applications referred to herein.

When wood and certain charcoals are employed for the carbon base, the inorganic ash present may serve in whole or in part for the additional component which may be later removed by a dilute acid, e. g., hydrochloric acid.

Examples of other components to be removed during or after heating and activation are as follows:

1. Volatile substances such as ammonium chloride, ammonium acetate, aluminum chloride, zinc, etc.

2. Substances which are removed by acids and other solvents.

(a) Metals which are electro-negative to hydrogen, e. g., magnesium, zinc, aluminum, iron, etc.

(b) Oxides, carbonates and other compounds of various metals.

These additional components are introduced into the material employed for the preparation of the charcoal, preferably, in a finely-divided state, the finer such material is the better the action.

Where a material which is to be removed by volatilization is employed as the additional component in the manufacture of activated carbon by my new process, the stage of the process at which the volatilization takes place will depend upon the material used. In the case of materials volatilizing at a low temperature part or all of the volatile material will come off during the primary heating, that is, while the charring of the binding material takes place. In general, I prefer to use materials which volatilize between 300 and 1000° C.

A specific example of preparing an activated carbon by my new process is as follows. A mixture of finely-divided carbon and finely-divided calcium or magnesium carbonate is mixed with an emulsion of coal-tar pitch and a coal-tar oil, such as anthracene oil, according to the method outlined in my Patent No. 1,478,985. The mixture is then filtered to remove most of the water and dried.

The mixture freed from water is then compressed as described in my co-pending application. Any substantial pressure will suffice. However, the quality of the product improves with increase in pressure up to a certain point. The function of molding under pressure is a very important one, determining to a large extent the nature and quality of the finished product. The best types of charcoal among other things are those which possess a large degree of porosity and have supporting walls which are most dense. These are the qualities which molding under pressure gives the finished product. Also, the pores and ducts should be of the continuous or spongy type. When the mixture of binder and carbon is heated without first molding under pressure a large proportion of the ducts are discontinuous and the product is friable because the walls are not sufficiently dense. The molded material is then comminuted, heated to decompose the binder and then activated by repeated heating or in the presence of steam or other suitable mild oxidizing agent.

The temperature at which it is necessary to heat the molded material, whether comminuted or not, in order to char the binding material is dependent upon the melting point of the binder and also upon the quantity of other materials besides carbon employed with the binder. The material is introduced into a furnace and gradually brought to the decomposing temperature. Schedules of four hours at approximately 850° C., then to about 925° C., for about $\frac{1}{2}$ hour and of about three hours at 925-950° C., have proven satisfactory.

I have found that a final heat treatment following the above steps causes a marked improvement in the efficiency of the charcoal. The apparent density of the charcoal after this treatment shows a pronounced lowering which, it is thought, is caused by the internal oxidation of adsorbed air or the removal of hydrocarbons, or both of these treatments. Heating beyond a certain length of time in the first carbonization treatment causes little improvement in the charcoal; however, if the charcoal is allowed to cool to about 250° C., removed from the furnace and cooled in the air to room temperature, and is then again raised to the high temperature, improved results are accomplished. This second heat treating process may be carried on for about two hours at about 850-950° C. In some instances a similar third heat treatment may give beneficial results. Heating in the presence of steam or other mild oxidizing agents often produces beneficial results. This may be accomplished by any well known method, for example, by introducing steam or carbon dioxide directly into the retort.

During the charring and activation the calcium of magnesium carbonate are decomposed, $CO_2$ passing off and leaving the metal oxide residues. These are removed by treating the activated carbon with a dilute acid, such as hydrochloric acid, washing thoroughly and then drying.

A very good activated carbon may be prepared by my new process by substituting pine-tar pitch for the coal-tar pitch and proceeding as in the previous example.

The quantity of magnesium or calcium carbonate or other additional volatile or soluble component added to improve the activity of the carbon may vary from a trace up to as much as an equal volume of the carbon itself, depending to what extent these additional components are relied upon for improving the adsorbent qualities of the carbon. The relative proportions of carbon to binder and of the constituents of the binder to each other are substantially as disclosed in the co-pending applications.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of making built-up, structural adsorbent charcoal, molding a mixture of finely-divided carbon, a binder which chars on heating and other finely-divided material capable of being removed by means which are not destructive to the carbon, charring the binding material therein and activating by heating and removing the residue of said other material by means not destructive to the carbon.

2. In a process of making built-up, structural adsorbent charcoal, molding a mixture of finely-divided carbon, a binder which chars on heating and finely-divided inorganic material capable of being removed by means which are not destructive to the carbon, charring the binding material therein and activating by heating and removing the residue of said inorganic material by means not destructive to the carbon.

3. In a process of making built-up, structural adsorbent charcoal, molding under substantial pressure a mixture of finely-divided carbon, a binder which chars on heating and finely-divided, inorganic material, charring the binding material therein and activating by heating and removing the residue of said inorganic material by treatment with an acid solvent.

4. In a process of making built-up, structural adsorbent charcoal, molding a mixture of finely-divided carbon, a binder which chars on heating and other finely-divided material capable of being removed by means which are not destructive to the carbon, comminuting the molded material, charring the binding material therein and activating by heating and removing the residue of said other material by means not destructive to the carbon.

5. In a process of making built-up, structural adsorbent charcoal, molding under substantial pressure a mixture of finely-divided carbon, a binder which chars on heating and other finely-divided material capable of being removed by means which are not destructive to the carbon, comminuting the molded material, charring the binding material therein and activating by heating and removing the residue of said other material by means not destructive to the carbon.

6. In a process of making built-up, structural adsorbent charcoal, molding a mixture of finely-divided carbon, a binder which chars on heating and finely-divided inorganic material capable of being removed by means which are not destructive to the carbon, comminuting the molded material, charring the binding material therein and activating by heating and removing the residue of said inorganic material by means not destructive to the carbon.

7. In a process of making built-up, structural adsorbent charcoal, molding a mixture of finely-divided carbon, a binder which chars on heating and other finely divided material whose residue after burning may be leached out by an acid, comminuting the molded material, charring the binding material therein and activating by heating and removing the residue of said other material by treatment with an acid solvent.

8. In a process of making built-up, structural adsorbent charcoal, molding under substantial pressure a mixture of finely-divided carbon, a binder which chars on heating and finely-divided, inorganic material, comminuting the molded material, charring the binding material therein and activating by heating and removing the residue of said inorganic material by treatment with an acid solvent.

9. In a process of making built-up, structural adsorbent charcoal, molding a mixture of finely-divided carbon, a binder which chars on heating and finely-divided material volatile at temperatures below the combustion of activated carbon, comminuting the molded material, charring the binding material therein and activating by heating and removing said volatile material.

10. In a process of making built-up, structural adsorbent charcoal, molding a mixture of finely-divided carbon, a binder which chars on heating and other finely-divided material capable of being removed by means which are not destructive to the carbon, charring the binding material therein and activating by heating, steaming and removing the residue of said other material by means not destructive to the carbon.

11. In a process of making built-up, structural adsorbent charcoal, molding a mixture of finely-divided carbon, a binder which chars on heating and other finely-divided material whose residue after burning may be leached by an acid, comminuting the molded material, charring the binding material therein and activating by heating, steaming and removing the residue of said acid-soluble material by treatment with an acid solvent.

12. In a process of making built-up, structural adsorbent charcoal, molding a mixture of finely-divided carbon, a binder which chars on heating and finely-divided material volatile at temperatures below the combustion of activated carbon, comminuting the molded material, charring the binding material therein and activating by heating, steaming and removing said volatile material.

13. In a process of making built-up, structural adsorbent charcoal, forming a mixture of finely-divided carbon, an emulsion of a binder which chars on heating and other finely-divided material capable of being removed by means which are not destructive to the carbon, filtering, molding the residue, charring the binding material therein and activating by heating and removing the residue of said other material by means not destructive to the carbon.

14. In a process of making built-up, structural adsorbent charcoal, forming a mixture of finely-divided carbon, an emulsion of a binder which chars on heating and other finely-divided material capable of being removed by means which are not destructive to the carbon, filtering, molding the residue, charring the binding material therein and activating by heating and treatment with a mild oxidizing agent and removing the residue of said other material by means not destructive to the carbon.

15. In a process of making built-up, structural adsorbent charcoal, forming a mixture of finely-divided carbon, an aqueous emulsion of a binder which chars on heating and finely-divided inorganic material capable of being removed by means which are not destructive to the carbon, filtering, molding the residue, comminuting the molded material, charring the binding material therein and activating by heating and removing the residue of said inorganic material by means not destructive to the carbon.

16. In a process of making built-up, structural adsorbent charcoal, forming a mixture of finely-divided carbon, an emulsion of a binder which chars on heating and other finely-divided material whose residue after burning may be leached by an acid, filtering, molding the residue under substantial pressure, comminuting the molded material, charring the binding material therein and activating by heating and removing the residue of said other material by treatment with an acid solvent.

17. In a process of making built-up, structural adsorbent charcoal, forming a mixture of carbon, an emulsion of a binder which chars on heating and finely-divided, inorganic material, filtering, molding the residue under substantial pressure, comminuting the molded material, charring the binding material therein and activating by heating and treatment with a mild oxidizing agent and removing the residue of said inorganic material by treatment with an acid solvent.

18. In a process of making built-up, structural adsorbent charcoal, forming a mixture of finely-divided carbon, an emulsion of a binder which chars on heating and finely-divided, inorganic material, volatile at temperatures below the combustion of activated carbon, filtering, molding the residue under substantial pressure, charring the binding material therein and activating by heating and removing said volatile material.

19. In a process of making built-up, structural adsorbent charcoal, forming a mixture of finely-divided carbon, an emulsion of tar pitch and oil and other finely-divided material capable of being removed by means which are not destructive to the carbon, filtering, molding the residue, charring the binding material therein and activating by heating and removing the residue of said other material by means not destructive to the carbon.

20. In a process of making built-up, structural adsorbent charcoal, forming a mixture of finely-divided carbon, an aqueous emulsion of the tar pitch and oil and other finely-divided material capable of being removed by means which are not destructive to the carbon, filtering, molding the residue under substantial pressure, charring the binding material therein and activating by heating and treatment with a mild oxidizing agent and removing the residue of said other material by means not destructive to the carbon.

21. In a process of making built-up, structural adsorbent charcoal, forming a mixture of finely-divided carbon, an aqueous emulsion of tar pitch and a coal-tar oil and other finely-divided material capable of being removed by means which are not destructive to the carbon, filtering, molding the residue under substantial pressure, comminuting the molded material, charring the binding material therein and activating by heating and treatment with a mild oxidizing agent and removing the residue of said other material by means not destructive to the carbon.

22. In a process of making built-up, structural adsorbent charcoal, forming a mixture of finely-divided carbon, an emulsion of tar pitch and oil and other finely-divided material whose residue after burning may be leached by an acid, filtering, molding the residue under pressure, charring the binding material therein and activating by heating and removing the residue of said other material by treatment with an acid solvent.

23. In a process of making built-up, structural adsorbent charcoal, forming a mixture of finely-divided carbon, an emulsion of tar pitch and oil and a carbonate of an alkaline earth metal, filtering, molding the residue under substantial pressure, charring the binding material therein and activating by heating and removing the oxide of alkaline earth metal by treatment with an acid solvent.

24. In a process of making built-up, structural adsorbent charcoal, forming a mixture of finely-divided carbon, an aqueous emulsion of tar pitch and a coal-tar oil and a carbonate of an alkaline earth metal, filtering, molding the residue under substantial pressure, comminuting the molded material, charring the binding material therein and activating by heating and removing the oxide of alkaline earth metal by treatment with an acid solvent.

In testimony whereof I affix my signature.

JACQUE C. MORRELL.